United States Patent [19]

Buckler et al.

[11] 4,286,979

[45] Sep. 1, 1981

[54] FABRICATION OF OPTICAL FIBERS USING DIFFERENTIAL MODE-GROUP DELAY MEASUREMENT

[75] Inventors: Michael J. Buckler, Buford; Raymond B. Kummer, Norcross; Stephen C. Mettler, Decatur; Calvin M. Miller, Lilburn, all of Ga.

[73] Assignee: Bell Telephone Laboratories, Incorporated, Murray Hill, N.J.

[21] Appl. No.: 162,263

[22] Filed: Jun. 23, 1980

[51] Int. Cl.³ .................. C03B 37/07; C03B 37/075; G01N 21/00

[52] U.S. Cl. .......................................... 65/3 A; 65/2; 65/29; 356/73.1

[58] Field of Search .................. 65/2, 3 A, 4 B, 29; 356/73.1

[56] References Cited

U.S. PATENT DOCUMENTS

| Re. 28,029 | 6/1974 | Keck et al. | 65/3 A |
| 3,879,128 | 4/1975 | Presby | 65/29 X |
| 3,966,446 | 6/1976 | Miller | 65/2 |
| 4,135,901 | 1/1979 | Fujiwara | 65/2 |
| 4,181,433 | 1/1980 | Marcuse | 356/73.1 |
| 4,217,027 | 8/1980 | MacChesney et al. | 65/3 A X |

OTHER PUBLICATIONS

Cohen, "Pulse Transmission Measurements . . . ", Applied Optics, vol. 15, No. 7, Jul. 1976, pp. 1808-1814.
Jeunhomme et al., "Selective Mode Excitation . . . ", Applied Optics, vol. 17, No. 3, Feb. 1978, pp. 463-468.
Petermann, ". . . Differential Mode Delay in Optical Fibres . . . ", Electronics Letters, vol. 14, No. 24, Nov. 1978, pp. 793-794.
Epworth, "Phenomenom of Modal Noise in Fiber Systems", Proc. of Meeting on Optical Fiber Comm., ThD 1, Mar. 6-8, 1979, Washington, D.C., pp. 106-108.
Miller, "Loose Tube Splices for Optical Fibers", The Bell System Technical Journal, vol. 54, Sep. 1975, pp. 1215-1225.
Olshansky et al., "Differential Mode Attenuation Measurements . . . ", Applied Optics, vol. 17, No. 11, Jun. 1978, pp. 1830-1835.
Okamoto, "Comparison of Calculated and Measured Impulse . . . ", Applied Optics, vol. 18, No. 13, Jul. 1979, pp. 2199-2206.

Primary Examiner—Richard V. Fisher
Attorney, Agent, or Firm—Samuel H. Dworetsky

[57] ABSTRACT

A method of forming optical fibers with improved mode dispersion characteristics is disclosed. The technique involves differential mode-group delay measurement to optimize dispersion by means of appropriate index of refraction configurations. The differential delay measurement technique involves selectively launching light into the multimode fiber using a single mode fiber which is spliced to the multimode fiber using an adjustable splice including an index matching fluid.

9 Claims, 4 Drawing Figures

FABRICATION OF OPTICAL FIBERS USING DIFFERENTIAL MODE-GROUP DELAY MEASUREMENT

BACKGROUND OF THE INVENTION

1. Field of the Invention

This invention involves a technique for forming optical fibers, and more particularly for forming an optical fiber with an optimized index of refraction configuration using differential mode-group delay measurement.

2. Description of the Prior Art

The advantages that accrue when information is transmitted using electromagnetic waves in the "optical" region of the spectrum (0.4μ–2.0μ) have now been firmly established and well-accepted. These advantages include high bandwidth, immunity from electrical interference, and electrical isolation from connected terminals. While initial inquiry into the feasibility of optical transmission included consideration of numerous different transmission media, research and development performed during the past decade has established the viability of glass fibers as a primary transmission medium. These fibers generally comprise a core region where most of the transmission occurs and a cladding region of lower index of refraction where less, and in many configurations a negligibly small amount of transmission occurs. The cladding, by virtue of its lower index of refraction, contributes to the concentration of optical power within the fiber core and its transmission through the core without escaping to the outside environment. Additional material may serve the function of protecting the fiber, and many include additional glass layers and/or various plastic layers formed about the fiber.

The transmission characteristics of the fiber are very much dependent upon the fiber's index of refraction configuration, and especially on its variation in the radial direction. So, for example, outer regions of the cladding must have a lower index of refraction than inner transmitting regions of the fiber if effective waveguiding is to take place. Likewise, the fiber will transmit in many different electromagnetic configurations, or modes, or in only a single mode, depending upon the core size the index of refraction configuration, the wavelength of light being transmitted, as well as other parameters such as launching angle and curvature of the fiber. Never-the-less, as a general rule, a single mode fiber will have a relatively small diameter core, of the order of 10 microns, and a relatively thick cladding, of diameter on the order of 100 microns, while multimode fibers have a much larger core on the order of 50 microns, and a cladding approximately 25 microns thick.

Multimode fibers in which the transmitted radiation can exist in many different electromagnetic configurations generally have a radially graded index of refraction, although certain step indexed radial configurations will also transmit in the multimode configuration. The radial gradation is used to minimize the "mode dispersion" pulse broadening effect which is associated with multimode fibers. This pulse broadening is due to the different transmission paths associated with each of the modes. For example, in step index multimode fibers, lower order modes are transmitted essentially down the center of the fiber, while higher order modes are transmitted down the fiber along paths which oscillate back and forth from the center of the fiber core to its periphery. The longer optical path lengths associated with higher order modes generally result in longer transit times for these modes. A given pulse transmitted through the fiber is transmitted in a combination of many possible modes. Those portions of the pulse which are transmitted in higher order modes will arrive later than those portions transmitted in lower order modes, by virtue of the longer path length associated with the higher modes, and consequently the width of the pulse will be significantly broadened, with a concomitant lowering in bandwidth.

In a graded index multimode fiber, the radial gradation, by virtue of its lower index of refraction at larger radii, results in increased velocity for the higher order modes which spend more of their time at the periphery of the fiber core. This increase in velocity tends to compensate for the greater path length of higher order modes and approximately equalizes the transit time associated with the various modes thereby minimizing the mode dispersion effect.

The exact nature of the radial gradation and its effect on lowering mode dispersion is clearly a critical element in the design and function of an optical fiber. While theoretical studies predict various preferred index configurations, the art is still at a stage where direct measurement is desirable for direct determination of the mode dispersion properties of an optical fiber. One of the more promising techniques for measuring mode dispersion involves the selective excitation of particular mode groups within a fiber and the determination of the transit time associated with the excited subgroup of modes. Numerous subgroups within the fiber are excited individually and the mode dispersion properties of the fiber are thereby determined.

It is clear that the particular excitation technique used must effectively excite only a relatively small subgroup of modes if the technique is to be successful. One excitation technique involves the use of a beam focused by an appropriate lens and launched into the fiber. [See, for example, L. G. Cohen, Applied Optics 15, 1808 (1976), and L. Jeunhomme, et al Applied Optics 17 463 (1978)]. However, in order to obtain an acceptably small angular spectrum of rays, the lens must be placed far from the fiber. In addition, the technique is very sensitive to beam characteristics which are difficult to determine and to the physical characteristics of the fiber end face.

SUMMARY OF THE INVENTION

This invention is a technique for forming optical fibers of optimized index of refraction configuration using a novel differential mode-group delay measurement technique. In this technique, light is launched into a multimode fiber using a single mode fiber which is caused to radially scan the face of the multimode fiber. The light emerging from an appropriately chosen single mode fiber has angular and spatial characteristics which are particularly well-suited to the excitation of small subgroups of modes in a multimode fiber. Index matching fluid may be placed in the void between the single and multimode fibers in order to minimize changes in the beam direction due to fiber end face imperfections which are hard to predict and quantify. Differential group delay measurements of a manufactured fiber are taken and the index configuration of subsequent fibers is designed accordingly to minimize differential mode-group delay. Subsequent fibers are then again measured using this technique and the radial gradation is again changed accordingly. In this manner, the radial gradation which yields a fiber with optimized pulse dispersion is empirically determined. Subsequent fibers are manufactured accordingly, and may be monitored using this technique.

DETAILED DESCRIPTION

Figure 1:
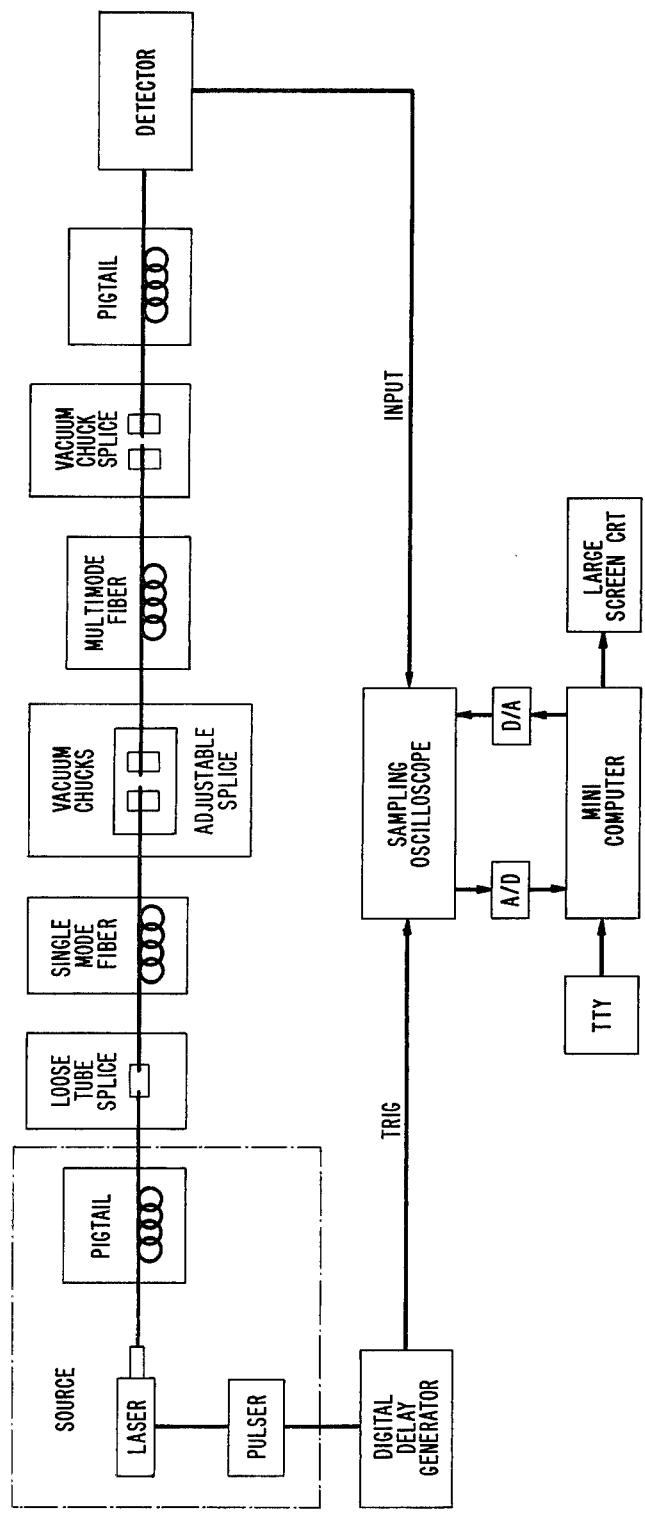
FIG. 1 is a block diagram of a typical mode-group delay measurement system.

The invention is a technique for forming optical fibers with optimized mode dispersion characteristics. The process relies upon measurement of the mode dispersion characteristics of a manufactured fiber using a differential mode-group delay technique, and on the basis of this measurement altering the index of refraction characteristics in subsequently manufactured fibers so as to optimize mode dispersion. Repetitive measurements and continued improvement in the index configuration of the fiber ultimately results in a fiber with empirically optimized mode dispersion. In most applications, fibers with optimized mode dispersion will be designed to have minimized mode dispersion. However, the invention is broad enough to encompass particular applications where a specific non-minimized mode dispersion characteristic is desired. Thereafter, manufactured fibers may be monitored to insure integrity of the desired design characteristics.

The differential delay measurement technique used in this invention involves selectively launching light into the multimode fiber using a single mode fiber. The single mode fiber is caused to scan the face of the multimode fiber thereby exciting various mode subgroups, for each of which the transmission delay time is measured.

Since the inventive technique depends upon the excitation of small subgroups of modes, the directionality properties of the beam which excites these modes is critical. Fiber endfaces which are not perfectly smooth, flat and perpendicular, as well as the difference in index of refraction between the fibers and the environment between the two fibers, all may lead to significant changes in directionality in the exciting beam, which will restrict the efficacy of the technique by exciting mode groups which cannot be easily predicted. Improved optical coupling, obtained by using index of refraction matching fluid in the region between the single mode and multimode fiber, helps to minimize these undesirable effects.

While the term "index matching" fluid has been used, it is clear that the index of the fluid need not match precisely the index of either of the fibers. For example in many embodiments the index of refraction of the index fluid may vary from the maximum index of refraction of the multimode fiber by as much as ten percent. In many high precision embodiments, the index of refraction of the index matching fluid will have a value between that of the maximum value of the multimode fiber and the cladding of the multimode fiber, a variation which usually falls within the range of two percent. These numbers might be compared with the index of refraction of air, the normal ambient environment between the fibers, which has a value of 30 percent less than a typical maximum index of refraction value for a multimode fiber. Typical index matching fluids include silicon oils, glycerine and Cargille Laboratories Index Matching Oil ("Index of Refraction Liquid").

The single mode fiber should have properties which will result in the excitation of only a limited subgroup of modes within the multimode fiber. Desirable properties will provide for a beam width (full width at $-e^{\frac{1}{2}}$ intensity) narrow enough to excite a limited subgroup of modes in the multimode fiber. The beam diameter should preferably be less than twenty percent, or in high precision embodiments less than ten percent of the diameter of the multimode fiber core. For single mode operation just below cut off, the beam width will be only slightly larger than the core diameter. However, for very small core diameters, diffraction effects may increase the angular divergence of the beam and consequently the size of the mode subgroups within the multimode fiber being excited, hence, preferred embodiments will operate with single-mode core diameters which result in optimized beam sizes, i.e., which excite the smallest mode-subgroup.

The single mode fiber is excited in an exemplary embodiment with a laser, although other light sources may be advantageously used.

Utilization of the inventive technique for high precision measurement will involve the alignment of the single and multimode fiber axes to as close to parallel as possible. High precision measurements have been made with these axes aligned to within approximately one degree.

As discussed previously, measurement entails scanning the multimode fiber with the single mode fiber to excite differential mode subgroups whose transit time for transmission through the fiber is then measured. The single mode fiber is moved relative to the multimode fiber using micropositioners such as those commercially available and well-known to those skilled in the art. The fibers are held on the micropositioners using exemplary vacuum chucks, mechanical chucks or electrostatic chucks which are designed to simplify alignment, especially when compared to the prior art techniques, such as the use of beam optics for differential group delay measurement. Prior to placement of fiber in the chucks, the fiber faces are prepared by any one of the many prevalent scoring and breaking techniques known to those skilled in the art. Careful preparation of the fiber endfaces permit desirably small spacing between the fibers during measurement. In most embodiments, spacing will be less than ten microns. More careful preparation of the fiber endfaces will permit spacing of less than 5 microns.

The invention is advantageously practiced only with multimode fibers in which mode mixing is minimal. Clearly, if a particular subgroup of modes is excited only later to lose its identity because of mode mixing, the efficacy of the measurement is lost, since the measurement technique depends on the differential measurement of delay times of particular subgroups of modes.

The inventive fiber fabrication technique, while it relies on a differential group delay measurement using single mode fiber excitation, does not specifically depend on a particular fiber fabrication process. Consequently, the invention is broad enough to encompass any fiber fabrication process, such as the Modified Chemical Vapor Deposition process, (United States Application Serial No. 828,617, now U.S. Pat. No. 4,217,027) the soot process, (United States Patent Re 28,029) or the Vapor Axial Deposition process (U.S. Pat. Nos. 3,966,446 and 4,135,901), all of which processes involve thermochemically reacting gaseous glass precursor reactants to form an optical fiber. Measurement of the differential delay times as taught in this specification will permit the practitioner to alter the index of refraction variation in the multimode fiber in a prescribed manner (for example, by appropriately altering the thermochemical reaction such as by changing reactant concentration or flow rates, or reaction temperature) so as to obtain desirable bandwidth characteristics. The variation is effected with a view toward altering the modal delay characteristics of the fiber in a manner consistent with the desired bandwidth properties. The relationship between index of refraction configuration and modal delay characteristics is well-known to practitioners of the art [see C. K. Peterman Electronics Letters 14, 793 (1978)].

EXAMPLE

An exemplary inventive experimental arrangement for group delay measurement is depicted in FIG. 1. A typical source used for these measurements is an AlGaAs double heterostructure laser, operating at 0.825 $\mu$m. The laser is pulsed at a 25 kHz repetition rate, where the pulser clock signal also time synchronizes the measurement system through a very stable (approximately $\pm 10$ ps jitter) digital delay generator. This enhanced stability of the timing path becomes increasingly important when measuring very small differences in delay time. The output of the laser is coupled into a multimode fiber pigtail which is epoxied to the laser face for increased coupling efficiency and stability. The length of the pigtail is preferably kept as short as possible to minimize modal noise (see R. E. Epworth, Proc. of Meeting an Optical Fiber Comm., March 6-8, 1979, Washington, D.C. Paper THDI). This multimode fiber pigtail is then loose tube spliced, for minimum coupling loss, to a one meter length of a single mode fiber [see C. M. Miller, Bell System Technical Journal 54, 1217 (1975)]. Since the output spot size of the single mode fiber is approximately 7 $\mu$m, it can be used to selectively excite different mode subgroups in a multimode fiber. Selective excitation is achieved by splicing the single mode fiber directly to an unknown multimode fiber using an adjustable splice where the fiber ends are held in position adjustable (micromanipulator) vacuum chucks. End effects are reduced by using index matching oil in the adjustable splice.

The multimode fiber output signals are detected with a Si-avalanche photodiode below 0.9 $\mu$m and a Ge-avalanche photodiode at longer wavelengths. A sampling oscilloscope, triggered by the essentially jitter-free output of the digital delay generator, is used to measure the photodiode output thereby increasing the measurement range and accuracy. A minicomputer controlled via a TTY is used to sweep the oscilloscope and take $2^n$ averages. By performing a number of averages, amplitude and time uncertainties can be significantly reduced. This also allows for measurement of low-level signals which occur near the core-cladding boundary.

After precise alignment and initial positioning of the adjustable splice, translation in one direction is used to vary the radial (r) alignment of the single mode fiber launch into the multimode fiber under test. With high-precision micropositioners the radial resolution is on the order of 0.1 $\mu$m. For each selection of radial position, $2^n$ averages are taken and the averaged pulse shape is displayed on the large screen CRT. The time delay through the digital delay generator can be adjusted in steps of 10 ps until the displayed pulse peak is aligned with a CRT screen vertical graticule. The output pulses corresponding to different r values are thus observed, and the time shift of the peak of the pulses as a function of radial position is measured. (For a small spot size, the mode group number m of a near-parabolic fiber is approximately given as $$(m/M) \simeq (r/a)^2 \qquad (1)$$

where r is the launch position, a is the core radius, and M is the maximum mode number [see, R. Olshanksy, et al Applied Optics 17, 1830 (1978)].

This measurement technique can also be used to measure the radial dependence of differential delay times for the slope of the leading and/or trailing pulse edges. For fibers with near optimal profiles it has been found that the peak pulse time shifts correlate very well with pulse edge time shifts.

Figure 2:
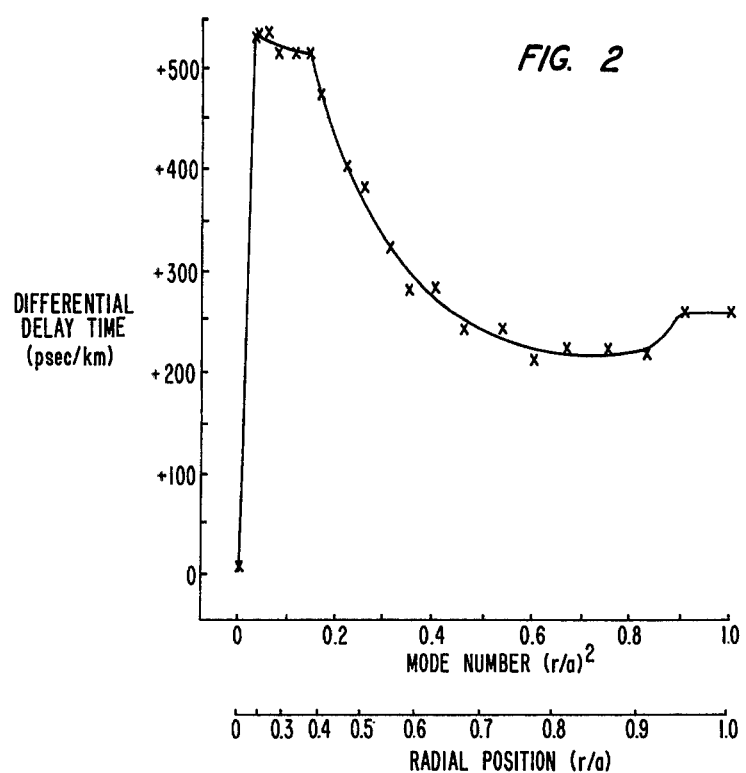
FIG. 2 is a plot of the differential mode-group delay time of a given fiber as a function of radial position of the exciting single mode fiber.
Figure 3:
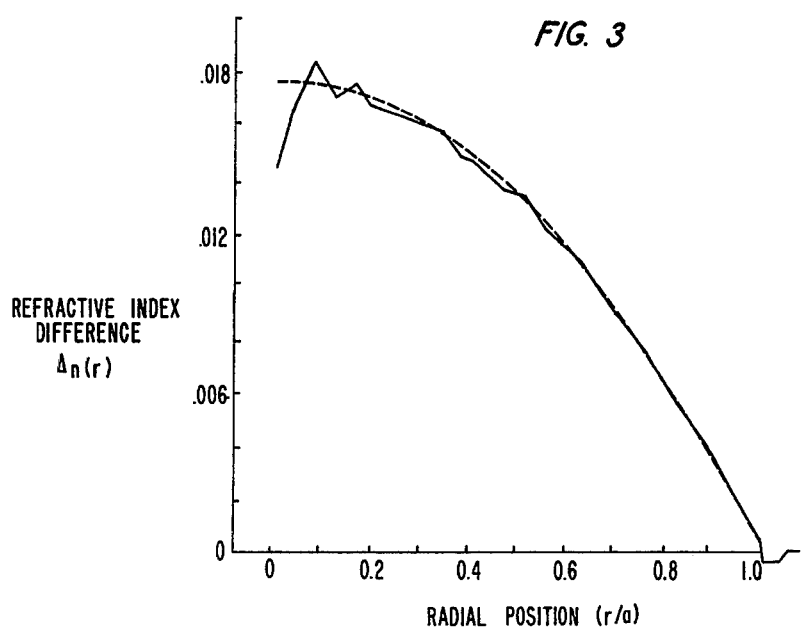
FIG. 3 is the refractive index profile for a fiber studied.

FIG. 2 shows a plot of the measured differential group delay time, relative to r=0, for a $GeO_2$—$P_2O_5$—$SiO_2$ fiber with a nearly optimal refractive index profile (optical 3 dB bandwidth of 883 MHz km). Ideally, there would be zero differential delay for all radial positions. The refractive index profile data for this fiber is shown in FIG. 3. This data is plotted as refractive index difference $$\Delta n(r) = n(r) - n(\text{cladding}) \qquad (2)$$

versus radial distance (r) from the fiber axis. The actual profile measurement data is taken in equal radial increments of 1.75 $\mu$m and is shown in FIG. 3 with straight line interconnection of the data points. Also shown in FIG. 3 is a dashed curve which represents the $0.15a < r < 0.95a$ best fit to a power law ($\alpha$) curve of the type $$n(r) = n(o) [1 - 2\Delta(r/a)^\alpha]^{\frac{1}{2}} \qquad (3)$$

where r is radial distance from the fiber axis, a is the core radius, n(o) is the index maximum, $\Delta$ is the relative index difference between the core center and cladding, and $\alpha$ is a power law exponent that characterizes the profile shape.

Comparison of the differential group delay time data (FIG. 2) and the refractive index profile data (FIG. 3) indicates a very good correlation. For instance, consider four general regions of radial position:

(i) $0.4a < r < 0.9a$; both the profile and the differential delay time curves are very smooth and monotonic, thus indicating that the profile closely approximates a power law shape, but not quite the correct power law.

(ii) $r < 0.2a$; the refractive index dip on axis (due to germanium burn-off during preform collapse) correlates with the on-axis rays arriving earlier than the other rays.

(iii) $0.2a < r < 0.4a$; in this region the nonmonotonic profile fluctuations correlate with delay time differences whose slope deviates from the smooth region between $0.4a < r < 0.9a$.

(iv) r>0.9a; here the core-cladding interface profile perturbations correlate with the erratic delay time differences.

Clearly, these differential delay time results can be used to provide direct feedback to the preform maker for appropriate adjustment of, for example, the gas flows and concomitant alteration in index configuration. Thus, by providing this iterative feedback, the fiber profiles can be optimally designed for optimum transmission bandwidth at a particular operating wavelength. Moreover, by using this very sensitive measure of differential delay time it should be possible to properly contour the profile shape for broadband optimization between 0.8 $\mu$m to 1.3 $\mu$m.

Figure 4:
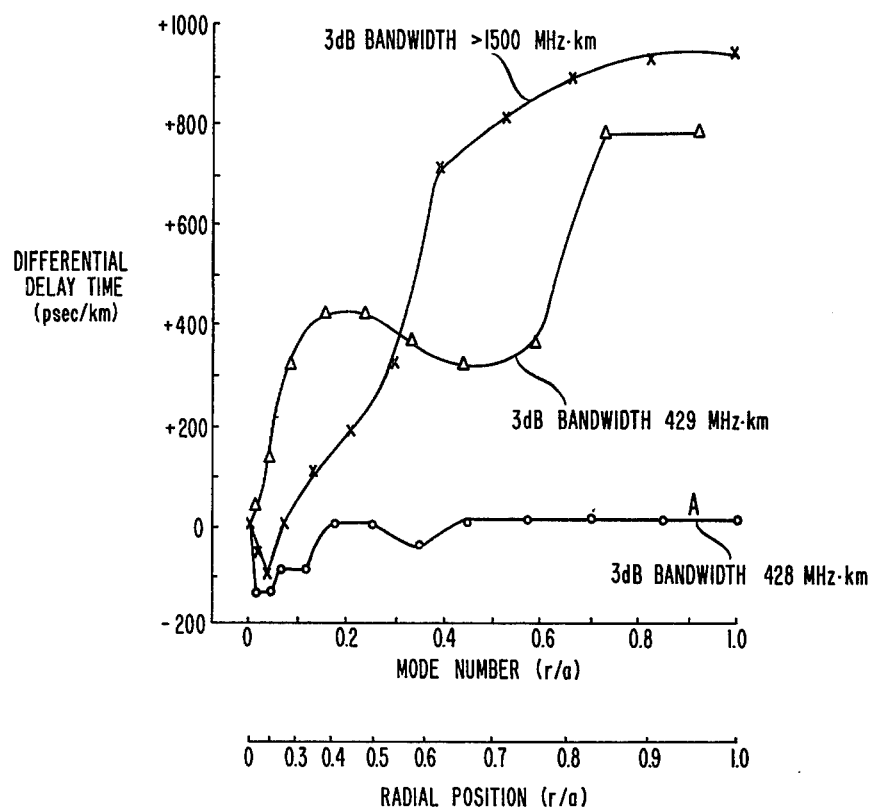
FIG. 4 is the diferential mode-group delay time versus radial position for three fibers studied.

FIG. 4 shows the differential group delay data for three other fibers which do not have optimum profiles. Fiber A is purposely shown here because it does not have an optimal profile, yet apparently has very good differential group delay characteristics. This apparent disagreement results because Fiber A has approximately 10 dB/km of microbending loss; i.e., a large amount of mode coupling. From a profile optimization viewpoint, this example clearly illustrates that strong mode coupling can produce an averaging effect which gives misleading results.

What is claimed is:

1. In a method of forming a multimode optical fiber with improved mode dispersion characteristics comprising thermochemically reacting gaseous glass precursor reactants to form a multimode optical fiber;

measuring the mode dispersion characteristics of the multimode fiber using a differential mode-group delay measurement technique;

altering, in accordance with the results of the measurement, the thermochemical reaction of the gaseous glass precursor reactants to form a multimode optical fiber with optimized mode dispersion characteristics, the invention CHARACTERIZED IN THAT the differential mode-group delay measurement technique comprises launching light into the multimode fiber using a single mode fiber which is spliced to the multimode fiber using an adjustable splice comprising an index matching fluid.

2. The method of claim 1 wherein the index of refraction of the index matching fluid is within ten percent of the maximum index of refraction of the multimode fiber.

3. The method of claim 2 wherein the index of refraction of the index matching fluid has an index of refraction value between that of the maximum index of refraction value of the multimode fiber and the index of refraction value of the cladding of the multimode fiber.

4. The method of claim 2 wherein the beam diameter of the beam exiting the single mode fiber is less than twenty percent of the diameter of the multimode fiber.

5. The method of claim 4 wherein the beam diameter of the beam exiting the single mode fiber is less than ten percent of the diameter of the multimode fiber core.

6. The method of claim 4 wherein the axes of the single mode fiber and the multimode fiber are parallel to within one degree.

7. The method of claim 4 wherein the single mode fiber and the multimode fiber are separated by a distance of less than ten microns.

8. The method of claim 7 wherein the single mode fiber and the multimode fiber are separated by a distance of less than five microns.

9. The method of claim 7 wherein the multimode fiber is formed using the Modified Chemical Vapor Deposition process, the Vapor Axial Deposition process or the shoot process.

* * * * *

UNITED STATES PATENT AND TRADEMARK OFFICE
CERTIFICATE OF CORRECTION

PATENT NO. : 4,286,979

DATED : September 1, 1981

INVENTOR(S) : Michael J. Buckler et al.

It is certified that error appears in the above—identified patent and that said Letters Patent is hereby corrected as shown below:

Column 4, line 9, should read --$e^{-1/2}$--.

Column 5, lines 53-54, should read --Ge-avalanche--.

Column 8, line 36, should read --soot--.

Signed and Sealed this

Sixteenth Day of March 1982

|SEAL|

Attest:

Attesting Officer

GERALD J. MOSSINGHOFF

Commissioner of Patents and Trademarks